United States Patent
Weiler et al.

(10) Patent No.: US 8,583,316 B2
(45) Date of Patent: Nov. 12, 2013

(54) CHECKING OF A COMMUNICATION SYSTEM FOR AN AIRCRAFT UNDER DEVELOPMENT

(75) Inventors: Yves Weiler, Toulouse (FR); Laurent Coloma, Toulouse (FR)

(73) Assignee: Airbus Operations S.A.S., Toulouse (FR)

(*) Notice: Subject to any disclaimer, the term of this patent is extended or adjusted under 35 U.S.C. 154(b) by 181 days.

(21) Appl. No.: 13/075,510

(22) Filed: Mar. 30, 2011

(65) Prior Publication Data
US 2011/0270806 A1 Nov. 3, 2011

(30) Foreign Application Priority Data
May 3, 2010 (FR) ...................................... 10 53412

(51) Int. Cl.
  *G01M 17/00* (2006.01)
  *G06F 7/00* (2006.01)
  *G06F 19/00* (2011.01)

(52) U.S. Cl.
  USPC ........................................ 701/31.4; 707/698

(58) Field of Classification Search
  USPC ........................................ 701/31.4; 707/698
  See application file for complete search history.

(56) References Cited

U.S. PATENT DOCUMENTS

| | | | |
|---|---|---|---|
| 6,549,949 B1* | 4/2003 | Bowman-Amuah | 709/236 |
| 6,988,026 B2* | 1/2006 | Breed et al. | 701/31.4 |
| 7,123,608 B1* | 10/2006 | Scott et al. | 370/353 |
| 7,260,505 B2* | 8/2007 | Felke et al. | 702/187 |
| 7,313,467 B2* | 12/2007 | Breed et al. | 701/1 |
| 7,672,756 B2* | 3/2010 | Breed | 701/1 |
| 7,729,825 B2* | 6/2010 | Chigusa | 701/31.4 |
| 7,983,820 B2* | 7/2011 | Kelly et al. | 701/50 |
| 8,001,096 B2* | 8/2011 | Farber et al. | 707/698 |
| 8,239,094 B2* | 8/2012 | Underdal et al. | 701/29.4 |
| 8,239,402 B1* | 8/2012 | Kumaresan et al. | 707/769 |
| 8,265,800 B2* | 9/2012 | Smith et al. | 701/2 |
| 2003/0149548 A1* | 8/2003 | Mosses et al. | 702/184 |
| 2006/0026017 A1* | 2/2006 | Walker | 705/1 |
| 2006/0044146 A1* | 3/2006 | Ferguson et al. | 340/679 |

(Continued)

FOREIGN PATENT DOCUMENTS

JP 07105045 A * 4/1995

OTHER PUBLICATIONS

NPL 3600 STIC Search Results dated Jul. 2013.*

(Continued)

*Primary Examiner* — Mary Cheung
*Assistant Examiner* — Jean-Paul Cass
(74) *Attorney, Agent, or Firm* — Oblon, Spivak, McClelland, Maier & Neustadt, L.L.P.

(57) ABSTRACT

The invention relates to a method and a device for checking a communication system (3) comprising a plurality of modules (7) adapted to be installed in an aircraft under development (5), said checking device including:
  means (11) for building an identification and synchronization database (17) for said communication system (3), said database contractually defining interfaces between said plurality of modules from change notes relative to an initial technical definition,
  means (11) for defining, in said database (17), signals configured to be exchanged between said plurality of modules (7) via a plurality of connections (3) interconnecting said interfaces, said signals being defined to be synchronized with each other as well as with the physical materialization of said connections, and
  means (11) for checking, before an evaluation of a maturation test of the communication system (3), an interface consistency for all of said signals of said database (17).

20 Claims, 3 Drawing Sheets

(56) References Cited

U.S. PATENT DOCUMENTS

| | | | |
|---|---|---|---|
| 2006/0271248 A1* | 11/2006 | Cosgrove et al. | 701/2 |
| 2007/0294001 A1* | 12/2007 | Underdal et al. | 701/29 |
| 2008/0004843 A1 | 1/2008 | Pozuelo Cabrera | |
| 2008/0161989 A1* | 7/2008 | Breed | 701/29 |
| 2009/0184574 A1 | 7/2009 | Zavidniak et al. | |

OTHER PUBLICATIONS

French Preliminary Search Report issued Nov. 19, 2010 in Patent Applicatio No. FR 1053412 with English Translation of Category of Cited Documents.

* cited by examiner

FIG.3

S0 COMPATIBILITY

| item | TX system | RX system | Issue Description | Impact | Status |
|---|---|---|---|---|---|
| 1 | WIPS | CDS | -> Message length increase in output of WIPS. Buffer size is too small in DU input. | No message received so far. The compatibility with CDS interface will be done with B7 CDS definition for S1 | No WIPS display until CDS S1. |
| 2 | WIPS | FWS | -> Message length increase in output of WIPS. Buffer size is big enough in FWS input | Nevertheless, following signals will not be recevelved : WIPS_SYS_CTL_OPERATING_1,WIPS_CTL_AUTHORITY_1,WIPS_SYS_CTL_FAULT_1,WIPS_CTL_VLV_LEFT_CLS_1,WIPS_CTL_VLV_RIGHT_CLS_1,WIPS_CTL_VLV_LEFT_NOT_CLS_1,WIPS_CTL_VLV_LEFT_OLV_RIGHT_NOT_CLS_1,WIPS_CTL_VLV_RIGHT_OPN_1,WIPS_CTL_ | No impact. Alarms from WIPS are not defined in S0/1.0 FWS. They may be introduced in S0/2.0 with correction if they have time. |

C1 C2 C3 C4 C5 C6

39

CHECKING OF A COMMUNICATION SYSTEM FOR AN AIRCRAFT UNDER DEVELOPMENT

TECHNICAL FIELD

The present invention relates to the field of maturation tests in the development of an aircraft and more particularly, the synchronization and checking of a communication system for the aircraft under development before the maturation tests.

BACKGROUND OF THE INVENTION

An aircraft is provided with a communication system to ensure communication between a plurality of pieces of equipment. This equipment includes, for example, a control and display system in the cockpit, an engine control system, a landing gear system, a surveillance system, etc. All of this equipment or these systems must be able to communicate with each other to ensure the control and safety of the aircraft.

Each piece of equipment is configured to create and/or receive a plurality of signals as a function of its configuration status. For example, the landing gear system is configured to trigger certain signals relative to the status of the aircraft on the ground when pressure is detected on the wheels. On the other hand, other signals relative to an in-flight phase of the aircraft are triggered when no pressure is detected on the wheels.

Moreover, depending on the configuration or flight phase of the aircraft, certain signals can be inhibited while others are activated. For example, during landing, the signals not relevant to that event are inhibited so as not to bother or distract the pilots.

Moreover, in addition to the increasing complexity of aeronautic systems, new functions appear constantly such as, for example, airport navigation assistance, and obstacle prevention (ground, clouds, etc.) adding many information exchanges between the pieces of equipment.

Thus, in each stage of development of the aircraft, laboratory tests, functional simulation tests, initial tests on the aircraft, and certification tests are done in order to assess the maturity level of the various functional or physical equipment and the proper exchange of signals between the various pieces of equipment.

However, the various pieces of equipment of the aircraft can be developed in different geographical locations and by teams having increasingly specialized activities. This can complicate the coordination between all of these different teams.

In particular, different functional or physical equipment developed by different teams can have problems with interfaces that do not help ensure consistency of the exchanges of information between all of this equipment during maturation tests.

Initially, the tests can be prepared from hypotheses that are not completely frozen, provided by the different teams. However, other more precise functions continue to be developed, potentially creating major changes relative to the initial definitions. This can make it very difficult to ensure, on a large scale, the proper exchange of a very large number of signals and the proper synchronization between all of the equipment during maturation tests of the aircraft being developed.

Thus, certain problems can hinder the proper performance of the maturation tests and can require that costly changes be made before being able to redo the tests under good conditions.

For example, certain interfaces may not communicate with each other due to consistency problems between the functional and physical definitions of the interfaces and/or signals. There may also be problems with software applications that do not talk to each other due to deviations relative to what was initially planned.

It is also possible to have problems for certain wiring harnesses that do not match the anticipated model. This may require the modification or even replacement of the assemblies in question.

Furthermore, incorrect connections between the interfaces during the installation of the harnesses can damage some pieces of equipment during the tests.

Moreover, late technical modifications can create incompatibilities between the interfaces of the equipment.

All of these problems may have an impact on the development of the aircraft in terms of schedule and cost.

The object of the present invention is to propose a device and a method for checking a communication system resolving the aforementioned drawbacks, in particular by making it possible to check the consistency of the information exchanges between all of the systems of the aircraft under development.

BRIEF DESCRIPTION OF THE INVENTION

The present invention is defined by a method for checking a communication system comprising a plurality of modules adapted to be installed in an aircraft under development, the method including the following steps:
- building an identification and synchronization database for said communication system, said database contractually defining interfaces between said plurality of modules from change notes relative to an initial technical definition,
- defining, in said database, signals configured to be exchanged between said plurality of modules via a plurality of connections interconnecting said interfaces, said signals being defined to be synchronized with each other as well as with the physical materialization of said connections, and
- checking, before an evaluation of a maturation test of the communication system, an interface consistency for all of said signals of said database.

The method makes it possible to provide global visibility very far upstream of the evaluation of the maturation tests while making it possible to coordinate and harmonize the different modules. This makes it possible to ensure, on a large scale, the proper exchange of a very large number of signals (in the vicinity of one or several million and which can be of very different natures) between all of the modules of the aircraft and the appropriateness with the related physical connections. As a result, it makes it possible to greatly reduce the risks of damaging equipment of the aircraft during tests as well as complying with the production schedule for the aircraft. Indeed, the checking step makes it possible to check, before performing any maturation test, that there is no incompatibility between the interface and makes it possible to identify the deviations and/or any problems. The method then makes it possible to synchronize the developments of the modules, which have very different cycles, thereby making it possible to develop consistent specifications between the modules.

Advantageously, the database includes a synchronization identification of the signals between said modules.

This makes it possible to synchronize the plurality of modules with the corresponding step of the maturation tests.

Advantageously, said synchronization identification defines a functional consistency between said signals, and coordination between the signals and the physical connections configured to convey said signals.

This makes it possible to achieve a good dialogue between the modules and good communication of the signals on the wiring harnesses.

Advantageously, the physical connections include cables each comprising a plurality of connectors corresponding to said plurality of connections interconnecting said interfaces, and the database includes a broaching identification and a correspondence between each signal and the connector configured to convey said signal.

Thus, the broaching consistency indicates on what connector the messages are located and therefore makes it possible to guarantee good communication between the modules.

Advantageously, the signals are defined by ensuring that each signal has the same characteristics between a transmitting module and a receiving module.

This makes it possible to guarantee a good dialogue and no loss of messages between the modules.

Advantageously, the method includes continuous updating of the database to include any functional and/or physical evolution of the interfaces and signals.

This makes it possible to have traceability of the changes while taking into account late requests for evolution of the system. In this way, it is possible to minimize the last-minute changes that can create excess costs, delays, and quality losses.

Advantageously, the method includes a successive construction of said database corresponding to the successive maturation test steps, each maturation test comprising, in an evolving manner, a set of functions to test where each function is configured to trigger a set of signals representative of said function.

Each set of functions to be tested defines an aircraft standard. This makes it possible to identify the needs of the set of maturation tests of the aircraft by assigning the different test means called into play for each of the standards.

Said maturation tests can include: functional tests, simulation tests, and tests on the aircraft.

Advantageously, each maturation test consists of checking the signals exchanged between the different modules, and evaluating the proper operation of the various modules of the aircraft.

The invention also relates to a device for checking a communication system comprising a plurality of modules adapted to be installed in an aircraft under development, said checking device including:
- means for building an identification and synchronization database for said communication system, said database contractually defining interfaces between said plurality of modules from change notes relative to an initial technical definition,
- means for defining, in said database, signals configured to be exchanged between said plurality of modules via a plurality of connections interconnecting said interfaces, said signals being defined to be synchronized with each other as well as with the physical materialization of said connections, and
- means for checking, before an evaluation of a maturation test of the communication system, an interface consistency for all of said signals of said database.

BRIEF DESCRIPTION OF THE DRAWINGS

FIG. 3 illustrates an example of a consistency analysis table, according to the invention.

DETAILED DESCRIPTION OF THE INVENTION

Figure 1:
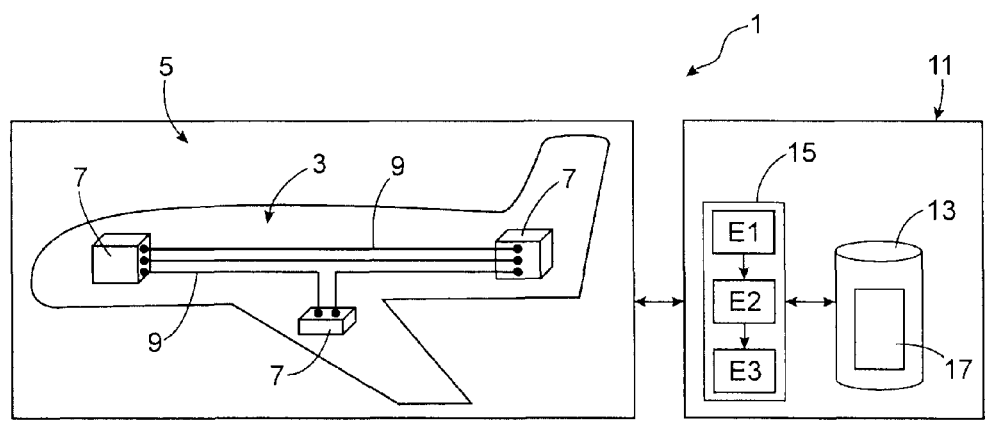
FIG. 1 shows a checking device for checking a communication system of an aircraft under development before maturation tests, according to the invention.

FIG. 1 diagrammatically illustrates a checking device that can be used to check a communication system of an aircraft under development 5 before the maturation tests, according to the invention. It will be noted that FIG. 1 is also an illustration of the checking method according to the invention.

The communication system 3 comprises a plurality of avionics modules or systems 7 adapted to be installed in an aircraft under development 5.

In general, an aircraft can include around sixty systems including modules 7 connected to each other by wiring harnesses. For simplification, FIG. 1 illustrates only three modules 7 configured to be connected to each other by connections 9 serving as communication support. Each of the modules 7 includes at least one connection interface provided with a plurality of contact points allowing the interconnection between the different modules 7 via the physical connections.

The checking device 1 includes processing means 11 comprising storage means 13 and computation means 15 configured to identify, synchronize and check the consistency of the interfaces between the modules 7 of the communication system 3, before the maturation tests.

The maturation tests are prepared from an initial technical definition of the functions or characteristics of the aircraft under development 5. However, these characteristics evolve and become increasingly precise during the development of the aircraft according to modification or evolution requests CN (change notes) established by the various teams developing the different modules 7.

Thus, according to the development phase of the aircraft, increasingly sophisticated maturation tests are performed. These tests can include functional tests, simulation tests, and tests on the aircraft such as, for example, powering on, the first flight, or the certification of the aircraft.

In step E1, the processing means 11 are adapted to build an identification and synchronization database 17 of the communication system 3, which can be stored in the storage means 13.

The functions to be tested are identified and the various test means called into play for each of the maturation tests are allocated.

More particularly, the processing means 11 are adapted to contractually define, in the database 17, the interfaces between the plurality of modules 7 of the aircraft under development 5, by using the change notes CN relative to the initial technical definition.

This first step makes it possible to clearly define the needs of the test means and to provide visibility on the development and interdependence of the different modules 7. Moreover, it makes it possible to coordinate the design, configuration, and set of test means on the modules 7 so as to guarantee the consistency of the technical definition for each given test means.

In step E2, the processing means 11 are adapted to define, in the database 17, signals configured to be exchanged between the plurality of modules 7 via a plurality of connections 9 interconnecting the interfaces. The signals are defined to be synchronized with each other as well as with the manufacture or physical materialization of these connections 9.

More particularly, the processing means 11 are adapted to build, in the database 17, a synchronization identification of the signals defining a functional consistency between the different signals, as well as coordination between the signals and the physical connections having to be manufactured to convey these signals between the different modules 7.

The physical connections that must be manufactured include cables each comprising a plurality of connectors corresponding to the plurality of connections 9 interconnecting the interfaces. In this way, a broaching identification and a correspondence between each signal and the connector configured to convey that signal are defined in the database 17.

More particularly, the processing means 11 is adapted to implement, in the database 17, the change notes CN in order to create as result, parameters or identifiers of the AC_ICD (Aircraft Inter Communication Data) signals. These AC_ICD identifiers define the logic information for the signals as well as the correspondence between the signals and the physical connections to be installed between the modules 7. In other words, an AC_ICD identifier that results from the database 17 identifies the signal and the connector having to convey this signal as well as the modules 7 transmitting and receiving said signal.

Advantageously, the signals are defined by ensuring that each signal has the same characteristics between the transmitting module and the receiving module. It will be noted that a signal can be a binary state or an analog measurement (e.g. voltage, temperature, frequency, etc.). The characteristics of a signal include the length of the message, the format, the medium used (discrete, analog, ADC bus, ARINC, AFDX, etc.). In this way, having the same characteristics between the transmitter and the receiver guarantees a good exchange and no loss of messages.

Moreover, it will be noted that the database is updated continuously to include any functional and/or physical evolution of the interfaces and signals according to the evolution of the change notes.

Thus, the second step makes it possible to coordinate, in an evolving manner, the functional or logic definition with the physical definition of the installation of the communication system 3. It also makes it possible to establish a phasing that serves as a reference for all of the teams developing the various modules 7.

In step E3, the processing means 11 are configured to use computer checking programs to check, before performance of the maturation tests of the communication system 3, the interface consistency for all of the signals of the database 17. In other words, the consistency of the content, synchronization, and interface is verified for all of the signals of the database 17 by using the identifiers of the AC_ICD signals.

This third step makes it possible to define the technical consistency to be achieved at each milestone of the aircraft's development and to establish an industrial method making it possible to satisfy the technical characteristics while taking into account the schedule parameters of the aircraft's development.

The present invention thus makes it possible to associate the functions that must be tested, the change notes CN making it possible to obtain the technical definition of the aircraft under development 5 performing these functions, and the timing of the maturation tests with each other in order to synchronize the set of operations making it possible to deliver this technical definition of the aircraft as well as identifying any deviation relative to what was provided in order to guarantee good communication between the modules 7 at the time of the maturation tests.

It will be noted that the database 17 is built successively to correspond to the evolution of the successive maturation tests by identifying the relevant change notes for each step of the maturation tests. Indeed, each step of the maturation tests comprises, in an evolving manner, a set of functions to be tested where each function is configured to trigger a set of signals representative of that function. Thus, the database 17 becomes larger after each step of the maturation tests.

The maturation tests then consist of checking the proper exchange of the signals between the different modules 7, and evaluating the proper operation of the different modules 7 or equipment of the aircraft under development 5.

Figure 2:
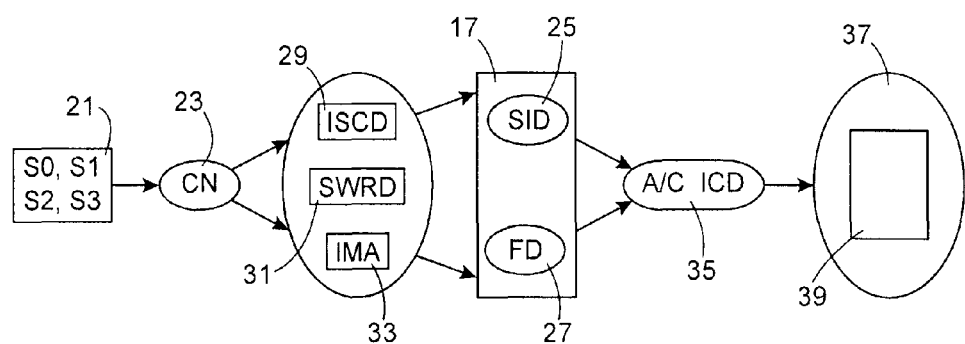
FIG. 2 illustrates an example of the checking method of the communication system, according to the invention.

FIG. 2 is a diagram illustrating one particular example of the synchronization method of the communication system, according to the invention.

Initially, this involves identifying a list of functions to be tested defining each step of the maturation tests (or standard) 21 of the aircraft under development 5. The main steps of the test include a preliminary standard S0 for tests on simulators, a first standard S1 for powering on the aircraft (Power On A/C), a second standard S2 for the first flight, and a third standard S3 for the certification.

Thus, first test steps S0 can be simulated on functional integrated test benches (FIB) to simulate functional tests on cabins, landing gear, etc.

Other test steps S1, S2, S3 can be carried out on the aircraft, or more generally on several aircraft serial numbers, such as, for example, powering on the aircraft S1, the first flight S2, or the certification of the aircraft S3.

Then, it involves defining the technical content required at each step of the maturation tests and ensuring proper synchronization. To that end, this phase consists of defining the list of change notes CN 23 called for defining the evolution of the technical characteristics of the different elements of the aircraft under development 5 to perform the functions to be tested and to implement the CNs 23. The priority of the change notes CN is identified relative to the schedule for the step for the maturation tests 21.

The implementation phase consists of integrating the change notes CN into a system interface document (SID) 25 and into functional diagrams (FD) 27. The SIDs and FDs correspond to the function definition of the aircraft under development 5. More particularly, the SID describes the type of logic information (logic state, voltage, temperature, frequency, . . . ) and the type of medium (discrete signal, analog, ADC bus, Arinc, AFDX). The FDs define correspondences between the signals and the wiring harnesses to be manufactured. The SIDs and FDs are used to build the identification and synchronization database 17.

More particularly, this database 17 is built from an interdependence between several processes including inter system communication data (ISCD) 29, a wiring requirement document (SWRD) 31, and an integrated module avionic (IMA) 33.

The aim of the ISCD process is to ensure good communication between the set of systems or modules 7 of the aircraft under development 5 (about sixty systems) knowing that the logic information for the signals is described in the system interface document SID. The major deliverable for the ISCD is the aircraft AC_ICD identifier 35.

The SWRD process makes it possible to establish plans that will serve to perform the wiring that will be installed in the aircraft. The main deliverable of the SWRD process is the functional diagram FD, which is also imported into the ISCD data and is therefore an input for the production of the AC_ICD identifier.

Lastly, the IMA process ensures intelligent communication between the modules 7 or systems based on two types of equipment, the data concentrator modules cRDC and the data processing integrator modules CPIOM. This cRDC and CPIOM equipment performs the conversions of the signals from one protocol to another and performs processing functions. To define the configuration of the cRDC and CPIOM, the IMA process needs data supplied by the ISCD and SWRD processes. In this way, to configure the IMA, the change notes CN are also incorporated during the implementation phase at the IMA.

The three ISCD, SWRD and IMA processes are closely related and interdependent. The particularity of the ISCD process is that it incorporates the data from the other two SWRD and IMA processes. It provides AC_ICDs that make it possible to specify communications between the modules 7 and to specify test benches. Indeed, the AC-ICD identifiers contain the logic part of the signals (coming from the SID) and the physical part (i.e. on what harness, coming from the FDs). In particular, the AC_ICDs contain the location of the information for each pin of each connector (allocation pin) provided by the IMA and the SWRD.

The interdependence between the ISCD, SWRD and IMA processes makes it possible to ensure the simultaneous technical consistency between these three processes. As an example, for an SWRD process that provides about 1400 FD, the ISCD process collects 850 SID and all of these files make it possible to define 1200 AC-ICD.

Moreover, among the modules 7 or systems relying on the ISCD process, there are so-called integrator systems such as, for instance, the flight warning system (FWS) and the cockpit display system (CDS). These are major systems, which concentrate a very large number of aircraft signals.

After building the database 17 defining the logic and physical information for the signals and the synchronization of the signals with each other and with the harnesses to be manufactured, it is now necessary to check that there is no incompatibility between the interfaces of the different modules 7 for each step of the maturation tests. To that end, it is possible to use a computerized consistency check tool (CCT) 37 to check for inconsistencies between the interfaces for all of the signals. The number of checks can be in the vicinity of several tens of millions.

The inconsistencies relative to the technical definitions are identified and analyzed using the AC_ICD identifiers. The analysis results can be synthesized in a consistency or incompatibility analysis table 39.

FIG. 3 illustrates an example of a consistency analysis table for the simulation maturation tests (standard S0). This table 39 includes a first column c1 indicating an inconsistency number, a second column c2 indicating the transmitting module, a third column c3 indicating the receiving module, a fourth column c4 indicating the description of the communication problem, a fifth column c5 indicating the impact of that problem, and lastly a sixth column c6 indicating the analysis or status of the problem. This analysis makes it possible to identify and discover each inconsistency in order to decide whether it is acceptable before the maturation tests begin.

For example, the first line indicates that the transmitting module is the WIPS (Wing Ice Protection System) and the receiving module is the CDS. The description of the problem indicates an increase in the length of the WIPS message relative to the hypotheses used by CDS. The impact of this problem indicates that there is no message received at that stage and that the compatibility with the interface of the CDS will be done during the definition of the CDS for the maturation tests S1. The analysis of the problem indicates that there is no display of the WIPS signal before the definition of the standard S1 of the CDS.

The second line indicates that the transmitting module is the WIPS and the receiving module is the FWS. The description of the problem indicates an increase in the length of the message transmitted by WIPS. The impact of this problem indicates that there is a list of signals that will not be received by the FWS. The analysis of the problem indicates that there is no impact because the alarms coming from the WIPS are not defined in standard S0 and can be introduced and possibly corrected for standard S1.

Thus, the checking phase makes it possible to ensure the consistency of the interfaces with the modules 7, before the exchange of signals during maturation tests.

Figure 4:
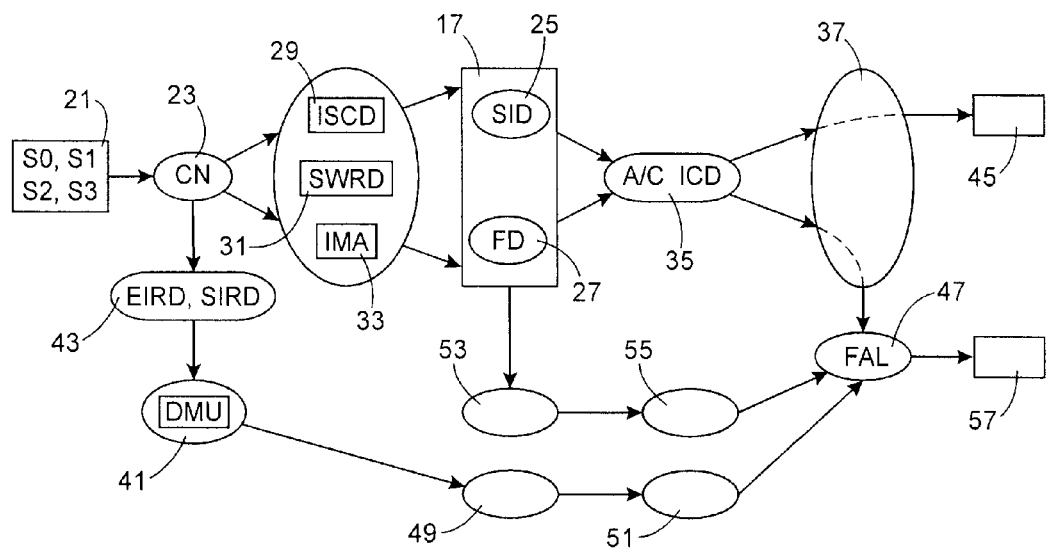
FIG. 4 illustrates the set of steps covered by the checking and the maturation tests of the communication system, according to the invention.

FIG. 4 is a diagram illustrating all of the steps covered by the checking and the maturation tests of the communication system.

In that case, the design mock-up (DMU) 41 is also defined. The DMU is established from an equipment installation requirement document (EIRD) and a system installation requirement document (SIRD) 43.

In order to define the technical content required at each step of the maturation tests, the change notes CN are incorporated during the implementation phase in the EIRDs and SIRDs for the installation, in addition to their incorporation in the FDs for the physical part, within the SIDs for the logic part, and at the IMA.

It will be noted that the AC_ICD identifiers delivered primarily by the ISCD serve as specifications for the installation of avionics software, as input to configure the test benches 45 that are adapted to use this software, and lastly for the final assembly of the aircraft FAL (Final Assembly Line) 47.

The DMU makes it possible to have the set of component elements of the aircraft under development designated and to install them together without clash. This step can be done in CAD with, for example, three-dimensional application software of the CATIA type. Once the installation is finalized, the plans for the pieces 49 can be made to manufacture the set of elementary pieces and the sub-assemblies 51 of the aircraft.

Moreover, the FDs make it possible to produce the wiring plans 53 to manufacture the harnesses 55. Thus, the set of pieces 51 and harnesses 55 will be assembled during the final assembly 47 of the aircraft FAL.

As before, after consistency checking 37 and possibly correcting the interfaces or connections between the modules of the communication system, it is possible to proceed under good conditions with the maturation tests on test banks 45 or on the aircraft 57 depending on the aircraft development phase.

The invention claimed is:

1. A method for checking an aircraft communication system comprised of a plurality of modules and adapted to be installed in an aircraft under development, the method comprising:
    building an identification and synchronization database for said aircraft communication system in memory, said database defining functions and characteristics of interfaces between said plurality of modules based on change notes relative to an initial technical definition;
    defining, in said database, signals configured to be exchanged between said plurality of modules via a plurality of connections interconnecting said interfaces, said signals being defined to be synchronized with each other and to be compatible with a physical materialization of said connections; and checking, before an evaluation of a maturation test of said aircraft communication system, interface consistency for all of said signals of said database using corresponding aircraft identifiers, each of which serves as a specification for avionics installation and includes a logic portion associated with said signals and a physical portion associated with the physical materialization of said connections.

2. The method according to claim 1, wherein the database includes a synchronization identification of the signals between said modules.

3. The method according to claim 2, wherein said synchronization identification defines a functional consistency between said signals, and coordination between said signals and physical connections corresponding to the physical materialization of said connections that are configured to convey said signals.

4. The method according to claim 3, wherein the physical connections include cables each including a plurality of connectors corresponding to said plurality of connections interconnecting said interfaces, and the database includes a broaching identification and a correspondence between each said signal and the connector configured to convey said signal.

5. The method according to claim 1, wherein said signals are defined by ensuring that each said signal has a same characteristics between a transmitting module and a receiving module of the plurality of modules.

6. The method according to claim 1, further comprising continuously updating of the database to include at least one of any functional and any physical evolution of said interfaces and said signals.

7. The method according to claim 1, wherein said building said database includes successive construction of said database corresponding to successive maturation tests, each maturation test including, in an evolving manner, a set of functions to test where each function is configured to trigger a set of signals representative of said function.

8. The method according to claim 7, wherein said maturation tests include: functional tests, simulation tests, and tests on the aircraft.

9. The method according to claim 8, wherein each maturation test consists of checking signals exchanged between the different modules, and evaluating a proper operation of the corresponding modules of the plurality of modules of the aircraft.

10. The method according to claim 1,
wherein the aircraft identifiers are used to analyze any interface inconsistencies identified by said checking, and
wherein the method further comprises synthesizing the analysis results to produce an incompatibility analysis table.

11. The method according to claim 1, further comprising:
identifying a list of functions to be tested for each maturation test of a plurality of maturation tests, including the maturation test of said checking; and
defining, for each said maturation test, technical content for each step, said defining including defining a list of change notes that define evolution of technical characteristics of different modules or connections of the aircraft under development to perform the functions to be tested and for implementation,
wherein the implementation includes integrating the change notes into one or more system interface documents and into one or more functional diagrams, the one or more system interface documents and the one or more functional diagrams corresponding to function definitions of the aircraft under development, and the one or more system interface documents and the one or more functional diagrams being used for said building said database.

12. The method according to claim 1, wherein said database includes at least one functional diagram and at least one system interface document, said at least one functional diagram and said at least one system interface document corresponding to a function definition of the aircraft under development.

13. The method according to claim 12,
wherein said at least one system interface document describes a type of logic and a type of medium, and
wherein said at least one functional diagram defines correspondences between said signals and a wiring harnesses to be manufactured.

14. The method according to claim 1, wherein said database is built based on interdependences between inter system data, a wiring requirement document, and an integrated module avionic, which in turn are based on the change notes and an identified list of functions to be tested.

15. The method according to claim 1, further comprising:
creating one or more of equipment or system installment requirements based on a list of functions to be tested and change notes and wiring plans created based on a functional diagram associated with said database.

16. A device for checking an aircraft communication system comprised of a plurality of modules and adapted to be installed in an aircraft under development, said checking device comprising circuitry configured to:
build an identification and synchronization database for said aircraft communication system in memory, said database defining functions and characteristics of interfaces between said plurality of modules based on change notes relative to an initial technical definition;
define, in said database, signals configured to be exchanged between said plurality of modules via a plurality of connections interconnecting said interfaces, said signals being defined to be synchronized with each other and to be compatible with a physical materialization of said connections; and
check, before an evaluation of a maturation test of said aircraft communication system, interface consistency for all of said signals of said database using corresponding aircraft identifiers, each of which serves as a specification for avionics installation and includes a logic portion associated with said signals and a physical portion associated with the physical materialization of said connections.

17. The device according to claim 16,
wherein the aircraft identifiers are used to analyze any interface inconsistencies identified by the checking using the circuitry, and
wherein the circuitry is further configured to synthesize the analysis results to produce an incompatibility analysis table.

18. The device according to claim 16, wherein the maturation test consists of checking the signals exchanged between the different modules and evaluating proper operation of the different modules.

19. A system for checking an aircraft communication system comprised of a plurality of modules and adapted to be installed in an aircraft under development, said checking system comprising circuitry configured to:
build an identification and synchronization database for said aircraft communication system in memory, said database defining functions and characteristics of interfaces between said plurality of modules based on change notes relative to an initial technical definition;
define, in said database, signals configured to be exchanged between said plurality of modules via a plurality of connections interconnecting said interfaces, said signals being defined to be synchronized with each other and to be compatible with a physical materialization of said connections; and
check interface consistency for all of said signals of said database using corresponding aircraft identifiers, each of which serves as a specification for avionics installation and includes a logic portion associated with said signals and a physical portion associated with the physical materialization of said connections.

20. The system according to claim 19,
wherein said database includes at least one functional diagram and at least one system interface document, said at least one functional diagram and said at least one system interface document corresponding to a function definition of the aircraft under development,
wherein said database is built based on interdependences between inter system data, a wiring requirement document, and an integrated module avionic, which in turn are based on the change notes and an identified list of functions to be tested, and
wherein each of said aircraft identifiers is created based on said database that includes the at least one functional diagram and the at least one system interface document and is built based on the interdependences between inter system data, the wiring requirement document, and the integrated module avionic, which in turn are based on the change notes and the identified list of functions to be tested.

* * * * *